United States Patent [19]

Okamoto et al.

[11] Patent Number: 5,510,414
[45] Date of Patent: Apr. 23, 1996

[54] POLYCARBONATE RESIN COMPOSITION AND PROCESS FOR PRODUCING THE SAME

[75] Inventors: Masaya Okamoto; Jiro Chiba, both of Ichihara, Japan

[73] Assignee: Idemitsu Petrochemical Co., Ltd., Tokyo, Japan

[21] Appl. No.: 389,978

[22] Filed: Feb. 14, 1995

Related U.S. Application Data

[63] Continuation of Ser. No. 84,259, Jul. 12, 1993, filed as PCT/JP92/01485, Nov. 13, 1992 abandoned.

[30] Foreign Application Priority Data

| Nov. 15, 1991 | [JP] | Japan | 3-300345 |
| Nov. 15, 1991 | [JP] | Japan | 3-300347 |
| Nov. 19, 1991 | [JP] | Japan | 3-303153 |
| Dec. 27, 1991 | [JP] | Japan | 3-346352 |

[51] Int. Cl.$^6$ .................................................... C08K 3/40
[52] U.S. Cl. ........................................................... 524/494
[58] Field of Search ................................................ 524/494

[56] References Cited

U.S. PATENT DOCUMENTS

| 4,224,215 | 9/1980 | Macke | 525/464 |
| 5,140,066 | 8/1992 | Dujardin et al. | 525/69 |

FOREIGN PATENT DOCUMENTS

| 0138528 | 4/1985 | European Pat. Off. . |
| 0376052 | 7/1990 | European Pat. Off. . |
| 0391191 | 10/1990 | European Pat. Off. . |
| 55-160052 | 12/1980 | Japan . |
| 59-49245 | 3/1984 | Japan . |
| 60-108467 | 6/1985 | Japan . |
| 60-127334 | 7/1985 | Japan . |
| 60-184561 | 9/1985 | Japan . |
| 62-138527 | 6/1987 | Japan . |
| 2-20552 | 1/1990 | Japan . |
| 2-173061 | 7/1990 | Japan . |
| 3-203927 | 9/1991 | Japan . |
| 3-292361 | 12/1991 | Japan . |
| 4-8761 | 1/1992 | Japan . |

*Primary Examiner*—Kriellion S. Morgan
*Attorney, Agent, or Firm*—Oblon, Spivak, McClelland, Maier, & Neustadt

[57] ABSTRACT

The object of the present invention is to develop a polycarbonate resin composition excellent in transparency and flame retardance and a process for producing the same.

The present invention relates to a polycarbonate resin composition which comprises (A) polycarbonate-based copolymer, (B) glass, and (C) polycarbonate resin, the difference (absolute value) between the refractive index of the mixed resin of (A) and (C), and that of (B) glass being not more than 0.01.

The present invention also relates to a process for producing a polycarbonate-based resin composition which comprises kneading (A) polycarbonate-based copolymer, (B) glass, and (C) polycarbonate resin, and adjusting the difference (absolute value) between the refractive index of the mixed resin of (A) and (C), and that of glass to not more than 0.01, by selecting kinds and proportions of the comonomer unit in (A) polycarbonate-based copolymer.

The polycarbonate resin composition of the present invention is excellent in transparency and flame retardance, and effectively utilized as the material for various molding products which are extensively used in the fields of electric or electronic appliances and cars.

6 Claims, No Drawings

POLYCARBONATE RESIN COMPOSITION AND PROCESS FOR PRODUCING THE SAME

This application is a Continuation of application Ser. No. 08/084,259, filed on Jul. 12, 1993, now abandoned, filed as International Application No. PCT/JP92/01485 on Nov. 13, 1992.

TECHNICAL FIELD

The present invention relates to a polycarbonate resin composition. More particularly, it relates to a polycarbonate resin composition excellent in transparency and flame retardancy and a process for efficiently producing the same.

PRIOR ART

Polycarbonate resins are superior in mechanical strength, electrical properties, and transparency, and have been used as engineering plastics, extensively in various fields of electrical and electronical appliances, and automobiles.

As polycarbonate resins having the above-mentioned characteristics, well known are glass fiber-reinforced polycarbonate resins comprising glass fiber for the purpose of improving rigidity and dimensional stability.

Polycarbonate resins, however, are given, by addition of glass fiber, a disadvantage in a considerable lowering in transparency to reveal an unfavorable opaque or obscure appearance. It is due to the difference in refractive index ($n_D$) between polycarbonate resin and glass fiber. The refractive index of polycarbonate resin is approximately 1.585, and that of "E" glass generally used for glass fiber-reinforced resin is approximately 1.545, which are considerably different.

To improve the above-mentioned disadvantage, Japanese Patent Publication No. 1338/1987 discloses blending, with polycarbonate resin, a specific glass fibers comprising $ZrO_2$ or $TiO_2$ having an effect of improving refractive index in addition to $SiO_2$ as the main ingredient of glass. However, blending a large amount of $TiO_2$ is accompanied by a problem in coloring glass into brown. Moreover, addition of $ZrO_2$ or $TiO_2$ to glass is involved in a difficulty of high price.

DISCLOSURE OF INVENTION

Under these circumstances, the present inventors repeated intensive studies in order to overcome the disadvantages of the conventional processes, and to develop a polycarbonate resin composition excellent in transparency and flame retardancy and a process for producing the same.

As the result, it was found that a polycarbonate resin composition provided with the desired properties can be realized by a resin composition comprising a polycarbonate-based copolymer, glass and a polycarbonate resin; said polycarbonate-based copolymer has a varied refractive index provided by selecting comonomer unit and proportion of it to be copolymerized with polycarbonate, and by copolymerizing (block or graft-polymerizing) those resins which comprise said comonomer unit and have different refractive indexes, or by copolymerizing (random polymerizing) said comonomer unit. The present invention has been accomplished on the basis of this finding.

That is, the present invention provides a polycarbonate resin composition comprising (A) 10 to 95% by weight of a polycarbonate copolymer, (B) 5 to 70% by weight of glass, and (C) 0 to 85% by weight of a polycarbonate resin, wherein the difference (inabsolute value) between the refractive index of the mixed resin of (A) and (C) and that of (B) glass is not more than 0.01.

The present invention also provides a process for producing a polycarbonate resin composition which comprises kneading (A) 10 to 95% by weight of a polycarbonate-based copolymer, (B) 5 to 70% by weight of glass, and (C) 0 to 85% by weight of a polycarbonate resin, and adjusting the difference (in absolute value) of (A) and (C), and that of (B) glass to not more than 0.01 by selecting the kind and the proportion of comonomer unit in (A) polycarbonate-based copolymer.

THE MOST PREFERRED EMBODIMENT TO CARRY OUT THE INVENTION

First, the polycarbonate-based copolymer as component (A) which constitutes the polycarbonate resin composition of the present invention (hereinafter referred to as Resin Composition) can be given a refractive index close to that of glass by selecting the kind and the proportion of comonomer unit in said polycarbonate-based copolymer.

Specifically, as the examples of the polycarbonate-based copolymers having different refractive indexes and being capable of giving a refractive index smaller than that of the polycarbonate resin, mentioned are polycarbonate-polyorganosiloxane copolymers, polycarbonate-acryl resin copolymers, and polycarbonate-polyetherglycol copolymers, of which comonomer units are organosiloxane unit, acrylic monomer unit, and etherglycol unit, repsectively.

As the example of the polycarbonate-based copolymers having different refractive indexes and being capable of giving a refractive indexes larger than that of the polycarbonate resin, polycarbonate-polystryrene copolymers are mentioned. Generally, the refractive index of glass is smaller than that of polycarbonate resin. Accordingly, resins having a refractive index smaller than that of polycarbonate resin are preferred.

Comonomers being capable of varying refractive index by copolymerization are those which can make refractive index smaller when copolymerized with bisphenol A, the main monomer of polycarbonate resin. Examples of these copolymers are dihydric phenols as follows:

a) 3,3-bis(3-cyclohexyl-4-hydroxyphenyl)pentane
b) 2,2-bis(3-cyclohexyl-4-hydroxyphenyl)propane
c) 1,1-bis(3-cyclohexyl-4-hydroxyphenyl)cyclohexane
d) bis(3-cyclohexyl-4-hydroxyphenyl)diphenylmethane
e) 1,1-bis(3-methyl-4-hydroxyphenyl)propane [bisphenol C]
f) 1,1-(3-cyclohexyl-4-hydroxyphenyl)-1-phenylethane
g) 3,3-bis(4-hydroxyphenyl)pentane
h) 2,2-bis(4-hydroxyphenyl)-1,1,1,3,3,3-hexafluoropropane
[bisphenol AF: BPAF]
Among them, BPAF is effective.

Other comonomers capable of varying refractive index by copolymerization are straight-chain aliphatic divalent carboxylic acids which also have an effect to make refractive index smaller. Examples of them are adipic acid, pimelic acid, suberic acid, azelaic acid, sebacic acid, and decanedicarboxylic acid. Particularly, those having long aliphatic chain are effective.

These effective polycarbonate-based copolymers may be blended to be used for obtaining a desired refractive index. When the refractive indexes of these polycarbonate-based copolymers are smaller than the desired value, a proper amount of usual polycarbonate resin can be blended to obtain the desired refractive index.

Herein, typical examples of the above-mentioned polycarbonate-based copolymer will be specifically described.

First, description will be made on polycarbonate-polyorganosiloxane copolymer (PC-PDMS copolymer) wherein organosiloxane unit is the comonomer unit to be copolymerized with polycarbonate resin to give the resulting copolymer a refractive index smaller than that of the polycarbonate resin.

Said PC-PDMS copolymer includes various ones. Preferable examples comprise a polycarbonate moiety with a degree of polymerization of 3 to 50 having a repeating unit having a structure represented by the general formula (I):

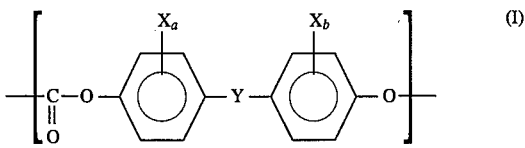

wherein X is independently a halogen atom such as chlorine, bromine, fluorine, and iodine, or an alkyl group having 1 to 8 carbon atoms; when plural X exist, they may be identical or different; a and b are each an integer of 0 to 4; Y indicates an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, or bonds such as —S—, —SO—, —$SO_2$—, —O—, —CO—, a single bond, or bonds represented by the general formula (II):

and a polyorganosiloxane moiety having a repeating unit represented by the general formula (III):

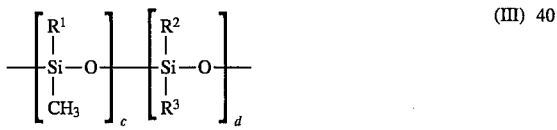

wherein $R^1$, $R^2$ and $R^3$ are each a hydrogen atom, an alkyl group having 1 to 5 carbon atoms, or an aryl group having 6 to 12 carbon atoms, and may be identical or different; c and d are each 0 or an integer of 1 or more. The degree of polymerization of above polyorganosiloxane moiety is preferably not more than 100, more preferably not more than 50. If the degree of polymerization is in excess of 100, the transparency of the copolymer comes to be unfavorably low.

The above-mentioned polycarbonate-polyorganosiloxane copolymer is a block copolymer comprising a polycarbonate moiety having a repeating unit represented by the general formula (I) and a polyorganosiloxane moiety having a repeating unit represented by the general formula (III), and has a viscosity average molecular weight of 10,000 to 40,000, preferably 15,000 to 35,000.

The proportions of the polycarbonate moiety and the polyorganosiloxane moiety in the above polycarbonate-polyorganosiloxane copolymer vary with the refractive index to be required, and cannot be defined unconditionally, but are usually selected in the range of 50 to 99.9%, preferably 60 to 99.5% by weight of polycarbonate moiety, and 50 to 0.1% by weight, preferably 40 to 0.5% by weight of polyorganosiloxane moiety.

In order to prepare the above-mentioned polycarbonate-polyorganosiloxane copolymer, a polycarbonate oligomer (PC oligomer) which constitutes the polycarbonate moiety previously prepared, and polyorganosiloxane (for example, polydialkylsiloxane such as polydimethylsiloxane and polydiethylsiloxane, and polymethylphenylsiloxane) having reactive group at the terminal and constituting polyorganosiloxane moiety are dissolved into solvents such as methylene chloride, chlorobenzene, or chloroform; and an aqueous solution of bisphenol dissolved in sodium hydroxide is added to the solution; and the resulting mixture is subjected to interfacial polycondensation in the presence of triethylamine or trimethylbenzylammoniumchloride as the catalyst. Also polycarbonate-polyorganosiloxane copolymers produced according to the processes described in Japanese Patent Publication Nos. 30105/1969 and 20510/1970 can be used.

Therein, the polycarbonate oligomer having a repeating unit represented by the general formula (I) is represented by the general formula (IV):

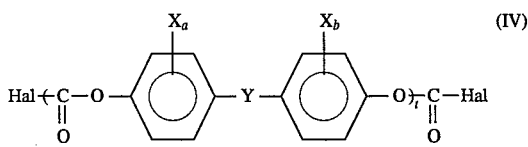

wherein X, Y, a and b are as defined above, and Hal indicates a halogen atom such as chlorine, bromine, fluorine, and iodine, and t=2 to 20.

The polycarbonate oligomer represented by the general formula (IV) can be easily produced by the solvent method, that is, by reacting, in the presence of a known acid-acceptor and molecular weight modifier in a solvent such as methylene chloride, a dihydric phenol represented by the general formula (V):

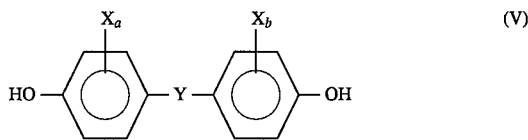

wherein X,Y,a and b are as defined above, and a carbonate precursor such as phosgene or a carbonic ester compound.

For example, said polycarbonate oligomer is produced by a reaction of dihydric phenol and a carbonate precursor such as phosgene, or by transesterification of a dihydric phenol and a carbonate precursor such as diphenyl carbonate, in a solvent such as methylene chloride in the presence of a known acid acceptor and a molecular weight modifier.

Therein, dihydric phenols represented by the general formula (V) above include various ones. Among them, 2,2-bis(4-hydroxyphenyl)propane [bisphenyl A] is particularly preferable.

Also a part or the whole of bisphenol A may be substituted by another dihydric phenol. Dihydric phenols other than bisphenol A include bis(4-hydroxyphenyl)alkanes other than bisphenol A, such as 1,1-(4-hydroxyphenyl)methane, 1,1-(4-hydroxyphenyl) ethane, hydroquinone, 4,4'-dihydroxydiphenyl, bis(4-hydroxyphenyl)cycloalkane, bis(4-hydroxyphenyl)sulfide, bis(4-hydroxyphenyl)sulfone, bis(4-hydroxyphenyl)sulfoxide, bis(4-hydroxyphenyl)ether, and bis(4-hydroxyphenyl)ketone; and halogenated phenols such as bis(3,5-dibromo-4-hydroxyphenyl) propane, and bis(3,5-dichloro-4-hydroxyphenyl)propane. These dihydric phenols may be used singly, or as a mixture of two kinds or more of them. Carbonate precursors other than phosgene include bromophosgene, diphenyl carbonate, di-p-tolyl carbonate, phenyl-p-tolyl carbonate, di-p-chlorophenyl carbonate, dinaphthyl carbonate, dimethyl carbonate, and diethyl carbonate.

In the present invention, polycarbonate oligomer to be used for producing polycarbonate-polyorganosiloxane copolymer may be homopolymer produced from one of these dihydric phenols, or copolymer produced from two or more kinds of them. Further, they may be a thermoplastic random branched polycarbonate obtained by co-using a polyfunctional aromatic compound with the above-mentioned dihydric phenols.

The refractive index ($n_D$) of the polycarbonate-polyorganosiloxane copolymer thus obtained can vary by selecting appropriately the content of polyorganosiloxane in the copolymer. For example, when polydimethylsiloxane is used as polyorganosiloxane, $n_D$ can vary to 1.50 from 1.585 of polycarbonate.

Next, description will be made on polycarbonate-acryl copolymer (PC-PMMA copolymer) which is obtained by copolymerizing a polycarbonate resin with a resin having different refractive index, and has a refractive index smaller than that of polycarbonate resin. The comonomer unit for said copolymer is acrylic monomer.

Said PC-PMMA copolymer is a copolymer comprising a polycarbonate moiety and acryl moiety.(correctly polyacrylate moiety), and includes various ones. Typical examples of them are polycarbonate-based graft copolymers represented by the general formula (VI):

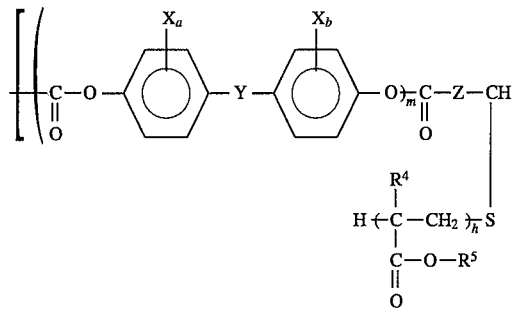

wherein X,Y, a and b are as defined above; Z indicates a single bond, —O—, —COO— or —NH—; $R^4$ indicates a hydrogen atom or a methyl group, and $R^5$ indicates an alkyl group having 1 to 18 carbon atoms or a cycloalkyl group having 3 to 18 carbon atoms; and m=2 to 40, n=3 to 41, h=10 to 500, and i=1 to 10, and polycarbonate-based block copolymer represented by the general formula (VII):

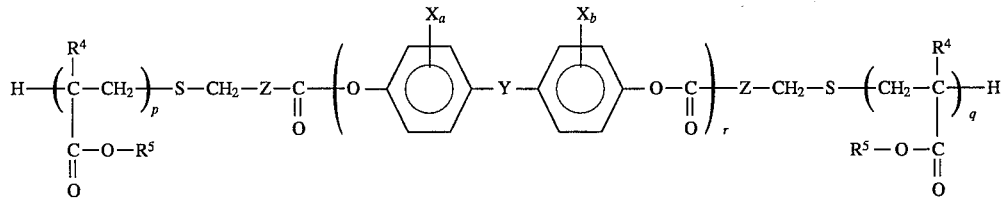

wherein X, Y, Z, a, b, $R^4$ and $R^5$ are as defined above; and p=10 to 500, q=10 to 500, and r=3 to 80.

These polycarbonate-based graft copolymers and block copolymers can be prepared by various methods. For example, they can be prepared by reacting bisphenol A with a prepolymer obtained by reacting polycarbonate oligomer and acryl resin macromonomer.

As polycarbonate oligomers therein, those produced in the same manner as above may be used.

On the other hand, acryl resin macromonomers include various ones. For example, acryl resin macromonomers to be used to produce the before-mentioned polycarbonate-based graft copolymer are those represented by the general formula (VIII):

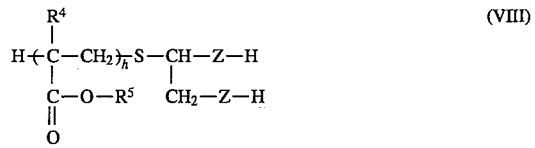

wherein $R^4$, $R^5$, h and Z are as defined above.

Acryl resin macromonomers to be used to produce the polycarbonate-based block copolymers mentioned before are those represented by the general formula (IX):

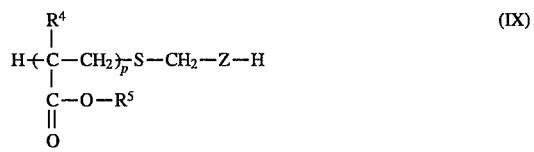

wherein $R^4$, $R^5$, p and Z are as defined above.

The acryl resin macromonomers represented by the general formula (VIII) mentioned before have, when they are acrylate and/or methacrylate for instance, a degree of polymerization of 10 to 500, preferably 20 to 300, and preferably have any of —OH, —COO H, and —NH$_2$ at the terminal.

Examples of the aforementioned acrylates are methyl acrylate, ethyl acrylate, propyl acrylate, and butyl acrylate. Examples of methacrylates are methyl methacrylate, ethyl methacrylate, butyl methacrylate, and cyclohyxyl methacrylate.

These acrylic resin macromonomers are, for example, produced as follows.

Acrylate and/or methacrylate as the comonomer unit is dissolved into a solvent, a chain-transfer agent, and a polymerization initiator are added thereto, and then the mixture is reacted for 30 minutes to 5 hours at a temperature rangeing from 40° to 70° C. Subsequently, the resulting product is poured into a precipitant to be precipitated, filtered, dried, and purified to obtain said macromonomer.

As the solvents therein, polar solvents such as tetrahydrofuran, and dimethylformamide; aromatic hydrocarbon solvents such as benzene, toluene, and xylene; and aliphatic hydrocarbon solvents such as hexane, heptane, and octane can be used. Among them, tetrahydrofuran is particularly preferred. As chain-transfer agents, thiomaleic acid, 2-mercapto-1,4-butanedicarboxylic acid and the like can be used. As polymerization initiators, radical initiators such as azobisisobutyronitrile, benzoyl peroxide, lauroyl peroxide can be used.

Acrylic resin macromonomers represented by the general formula (IX) above can be prepared using, as the chain-transfer agent, mercaptan (for example, thioglycolic acid) having one of —OH—, —COOH, —NH$_2$, =NH, in the same manner as in the acrylic resin macromonomers of the general formula (VIII).

The viscosity average molecular weight of the polycarbonate-acrylic copolymer thus obtained is not particularly limited, but is selected appropriately depending on purpose. Usually, it is 10,000 to 200,000, preferably 15,000 to 100,000. Said polycarbonate-acrylic copolymer can arbitrary vary its refractive index($n_D$) by varying the content of acryl moiety in the copolymer.

Specifically, the refractive index can vary from $n_D$=1.585 of a homopolymer of polycarbonate moiety (PC moiety) to $n_D$=1.489 of a homopolymer of acryl moiety.

Accordingly, the proportions of the polycarbonate moiety and the acryl moiety in said polycarbonate-acrylic copolymer vary depending on refractive indexes required, and cannot be defined unconditionally.

Now, following is an explanation of a polycarbonate-fluoropolycarbonate copolymer (PC-FPC copolymer) which is obtained by copolymerization using a dihydric phenol, BPAF particularly effective one as the comonomer to vary the refractive index of the polycarbonate resin.

Said PC-FPC copolymer includes various ones, but preferred are copolymers comprising a repeating unit represented by the general formula (X):

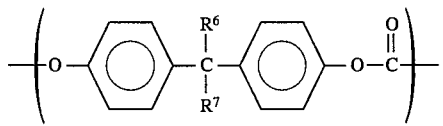

wherein $R^6$ and $R^7$ indicates each a hydrogen atom or an alkyl group having 1 to 4 carbon atoms, and a repeating unit represented by the general formula (XI):

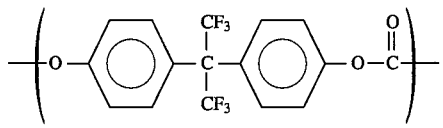

Herein, the number of each repeating unit is 1 or more. Said PC-FPC copolymer may be a block copolymer, a random copolymer, an alternating copolymer or a graft copolymer which comprises one or more each repeating unit polymerized. Otherwise, it may be a homopolymer of FPC, without PC. The viscosity average molecular weight of it is 10,000 to 50,000, preferably 15,000 to 40.000.

Said PC-FPC copolymer can vary the refractive index ($n_D$) freely by varying the FPC content in the copolymer. Specifically, the refractive index can vary from $n_D$=1.585 of a homopolymer of PC to $n_D$=1.50 of a homopolymer of FPC.

Accordingly, proportions of the polycarbonate moiety (PC) and the fluoropolycarbonate moiety (FPC) in said PC-FPC copolymer vary depending on the refractive indexes required, and cannot be defined unconditionally.

PC-FPC copolymers as mentioned above can be produced according to the method usually adopted for producing a polycarbonate, in which bis(4-hydroxyphenyl)alkane (BPAL) represented by the general formula (XII):

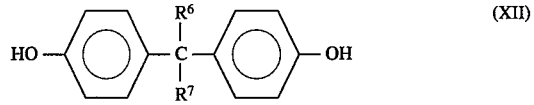

wherein $R^6$ and $R^7$ are as defined above, and 2,2-bis(4-hydroxyphenyl)-1,1,1,3,3,3-hexafluoropropane (BPAF) represented by the general formula (XIII):

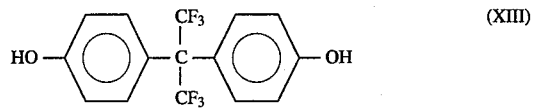

are used, and reacted with carbonate-forming compounds such as phosgene and diphenyl carbonate.

Said PC-FPC copolymers include (i) copolymers obtained by reacting BPAL and/or BPAF with PC-FPC oligomer prepared from BPAL and BPAF and phosgene, (ii) copolymers obtained by reacting BPAL and/or BPAF with PC oligomer or FPC oligomer prepared from BPAL or BPAF and phosgene, and (iii) copolymers prepared from BPAL and BPAF and phosgene.

As the bis(4-hydroxyphenyl)alkanes for preparing said PC-FPC copolymers, various ones can be used provided they are represented by the general formula (XII) above. Examples of them are 1,1-bis(4-hydroxyphenyl)ethane, 2,2-bis(4-hydroxyphenyl)propane [bisphenol A: BPA], and 2,2-bis(4-hydroxyphenyl)butane. Among them, bisphenol A (BPA) is particularly preferred.

Further, following is the explanation on polycarbonate-bisphenol C polycarbonate copolymer (PC-BPC copolymer), which is obtained by copolymerization using bisphenol C (BPC), as another effective example among the dihydric phenols, as the comonomer to vary the refractive index of the resulting polycarbonate resins.

The above-mentioned PC-BPC copolymers include various ones, but preferable are copolymers consisting of a repeating unit represented by the general formula (X):

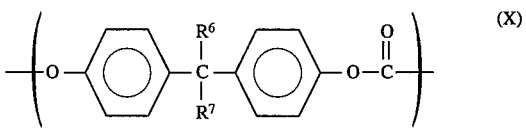

wherein $R^6$ and $R^7$ indicate independently a hydrogen atom or an alkyl group having 1 to 4 carbon atoms, and a repeating unit represented by the general formula (XIV):

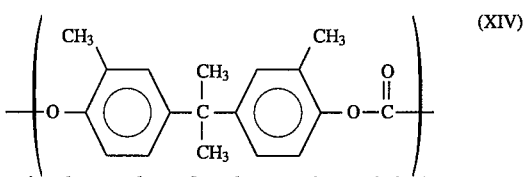

Therein, the number of each repeating unit is 1 or more. Said PC-BPC copolymers may be block copolymers, random copolymers, alternative copolymers or graft copolymers resulting from polymerization of one or more each repeating unit, or they may be homopolymers of BPC, without PC. The viscosity average molecular weight of them are 10,000 to 50,000, preferably 15,000 to 40,000.

The above-mentioned PC-BPC copolymer can vary its refractive index ($n_D$) freely by varying BPC content in the copolymer. Specifically, the refractive index can vary from $n_D=1.585$ of the homopolymer of PC to $n_D=1.57$ of the homopolymer of BPC.

Accordingly, the proportions of the polycarbonate moiety (PC) and the bisphenol C polycarbonate moiety (BPC) in said PC-BPC copolymer vary with the refractive index required, and cannot be defined unconditionally.

The above-mentioned PC-BPC copolymer can be produced by the methods usually taken for producing polycarbonates, in which bis (4-hydroxyphenyl)alkane (BPAL) represented by the general formula (XII):

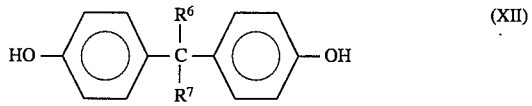
(XII)

wherein $R^6$ and $R^7$ are as defined above, and 1,1-bis(3-methyl-4-hydroxyphenyl)propane [bisphenol C: BPC] represented by the general formula (XV):

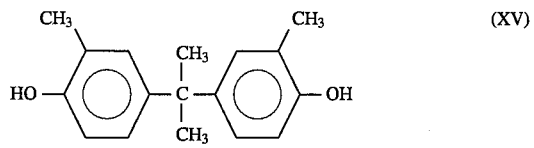
(XV)

are used, and reacted with carbonate-forming compounds such as phosgene and diphenyl carbonate.

Examples of these PC-BPC copolymers are (i) copolymers obtained by reacting BPAL and/or BPC with BPAL-BPC oligomer prepared from BPAL and BPC and phosgene, (ii) copolymers obtained by reacting BPAL and/or BPC with PC oligomer or BPC oligomer prepared from BPAL or BPC and phosgene, and (iii) copolymers prepared from BPAL and BPC and phosgene.

As the bis(4-hydroxyphenyl)alkanes for preparing these PC-BPC copolymers, various ones can be used provided they are represented by the general formula (XII) above. Examples of them are 1,1-bis(4-hydroxyphenyl)ethane, 2,2-bis(4-hydroxyphenyl)propane [bisphenol A: BPA], and 2,2-bis(4-hydroxyphenyl)butane. Among them, hisphenol A is particularly preferable.

Further, a description will be made on polycarbonate-decanedicarboxylic acid copolymer (PC-DDCA copolymer) obtained by copolymerization using, as the comonomer, decanedicarboxylic acid which is particularly effective among straight-chain aliphatic divalent carboxylic acid.

Said PC-DDCA copolymer includes various ones, but preferred are copolymers obtained from comonomers, that is, a repeating unit represented by the general formula (X):

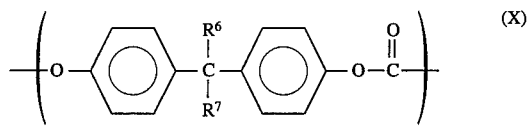
(X)

wherein, $R^6$ and $R^7$ are defined as follows, and decanedicarboxylic acid represented by the general formula (XVI):

$HOOC(CH_2)_{10}COOH$  (XVI)

Therein, the number of the repeating unit of the general formula(X) is 1 or more, and the number of the repeating unit of decanedicarboxylic acid is 1. Said PC-DDCA copolymer is a random copolymer or an alternative copolymer which results from polymerization of 1 or more repating unit of the general formula (X) and decanedicarboxylic acid. The viscosity average molecular weight of said copolymer is 10,000 to 50,000, preferably 15,000 to 40,000.

PC-DDCA copolymer can vary its refractive index ($n_D$) by varying DDCA content in the copolymer. Specifically, the refractive index can vary from $n_D=1.585$ of the homopolymer of PC to approximately 1.56.

Accordingly, proportions of the polycarbonate moiety (PC) and the DDCA copolymer moiety (DDCA) in said PC-DDCA copolymer vary with the refractive index required, and cannot be defined unconditionally.

Said PC-DDCA copolymers can be produced by the methods usually adoped for producing polycarbonate, in which bis(4-hydroxyphenyl)alkane (BPAL) represented by the general formula (XII):

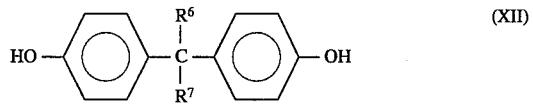
(XII)

wherein $R^6$ and $R^7$ are as defined before, and decanedicarboxylic acid (DDCA) represented by the general formula (XVI):

$HOOC(CH_2)_{10}COOH$  (XVI)

are used, and these BPAL and DDCA are reacted with carbonate-forming compounds such as phosgene and diphenylcarbonate.

Examples of said PC-DDCA copolymers are (i) copolymers obtained by reacting BPAL and/or DDCA with PC-DDCA oligomer prepared from BPAL and DDCA and phosgene, (ii) copolymers obtained by reacting DDCA only, or both of BPAL and DDCA with the PC oligomer prepared from BPAL and phosgene, and (iii) copolymers prepared from BPAL and DDCA and phosgene.

As the bis(4-hydroxyphenyl)alkane to be used for preparing said PC-DDCA copolymer, various ones can be used provided they are represented by the general formula (XII) above. Examples of them are 1,1-bis(4-hydroxyphenyl)ethane, 2,2-bis(4-hydroxyphenyl)propane [hisphenol A: BPA], and 2,2-bis(4-hydroxyphenyl)butane. Among them, hisphenol A (BPA) is particularly pereferable.

Polycarbonate resin (PC) as component (C) constituting the resin composition of the present invention can be easily produced by reacing a dihydric phenol represented by the general formula(V):

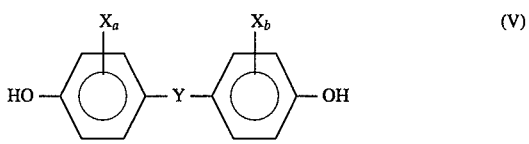
(V)

wherein X, Y, a and b are as defined before, and phosgene or carbonate compound.

Specifically, said polycarbonate resin is produced in a solvent such as methylene chloride, in the presence of known acid acceptor and molecular weight modifier, by the reaction of a dihydric phenol and a carbonate precursor such as phosgene, or by transesterification of a dihydric phenol and a carbonate precursor such as diphenyl carbonate. Therein, dihydric phenols include various ones, and particularly preferred is 2,2-bis(4-hydroxyphenyl)propane [bisphenol A]. Dihydric phenols other than bisphenol A include bis(4-hydroxyphenyl)alkanes other than bisphenol A, compounds such as hydroquinone, 4,4'-dihydroxydiphenyl, bis(4-hydroxyphenyl)cycloalkane, bis(4-hydroxyphenyl)sulfide, bis(4-hydroxyphenyl)sulfone, bis(4-hydroxyphenyl)sulfoxide, bis(4-hydroxyphenyl)ether, and bis(4-hydroxyphenyl)ketone; and halogenated bisphenols such as bis(3,5-dibromo-4-hydroxyphenyl)propane, and bis(3,5-dichloro-4-hydroxyphenyl)propane. These dihydric phenols may be used independently, or as a mixture of two or more kinds of them. Carbonate compounds include diaryl carbonates such as diphenyl carbonate, and dialkyl carbonates such as dimethyl carbonate, and diethyl carbonate.

On the other hand, as the glass as component (B) to be used with polycarbonate-based copolymer as component (A) and the polycarbonate resin as component (C) which constitute the resin composition of the present invention, various kinds or embodiments can be used.

For example, glass fiber, glass beads, glass flake, and glass powder can be used, and they can be used independently or in combination of two kinds or more. Among them, glass fiber extensively used for reinforcing the resin may be any of alkali-containing glass, low-alkali glass, and alkali-free glass. The length of the glass fiber is 0. 1 to 8 mm, preferably 0.3 to 6 mm, and the diameter of the glass fiber is 0.1 to 30 μm, preferably 0.5 to 25 μm. Form of the glass fiber is not particularly limited, and may be various ones including roving, milled fiber, and chopped strand. These glass fibers can be used independently or in combination of two kinds of more.

Further, in order to increase the affinity with resins, these glass materials may be surface-treated with silane-based coupling agents such as aminosilane-based, epoxysilane-based, vinylsilane-based, and methacrylsilane-based ones, chromium complexes, and boromide.

The resin composition of the present invention comprises the above-mentioned components (A) to (C), and the proportions of these components are: (A) 10 to 95% by weight, preferably 10 to 90% by weight of polycarbonate-based copolymer, (B) 5 to 70% by weight, preferably 10 to 60% by weight of glass, and (C) 0 to 85% by weight, preferably 0 to 80% by weight of polycarbonate resin. Therein, when a copolymer comprising a large proportion of polycarbonate moiety derived from dihydric phenol is used as (h) polycarbonate-based copolymer, the amount of (C) polycarbonate resin to be blended can be decreased, and, in some cases, polycarbonate resin as component (C) may not be blended.

In the resin composition of the present invention, if the proportion of (B) glass is less than 5% by weight, the dimentionalstability is unfavorably lowered. If it is in excess of 70% by weight, kneading of the resin comes to be difficult or impossible, and the appearance becomes unfavorably poor.

When "E" glass is used as glass, ($n_D$) of the refractive index of E glass is approximately 1.545. Accordingly, when PC-PDMS copolymer, for instance, is used therein, the refractive index of polycarbonate-based copolymer can be so close as 1.555 to 1.535 to that of glass, by blending 13 to 30% by weight of the copolymer moiety in (A) copolymer. Thus the use of PC-PDMS is very effective to improve the transparency of the resulting resin composition.

In the present invention, the difference (absolute value) between the refractive index of the mixed resin of (A) polycarbonate-based copolymer and (C) polycarbonate resin (PC) and that of glass should be not more than 0.01, preferably not more than 0.005. When said difference in refractive index (absolute value) between the mixed resin and glass is in excess of 0.01, the transparency of the molding obtained from the resin comosition is unfavorably low.

Next, the process for producing the resin composition of the present invention comprises, as described before, selecting the kinds and the proportions of comonomer units to be copolymerized with polycarbonate, and blending to knead a copolymerization resin obtained by copolymerization of the above-mentioned comonomer or a polycarbonate-based copolymer obtained by polymerizing said comonomer, as component (A), with components (B), (C) and various additive components to be used at need, thereby obtaining the desired resin composition.

Above-mentioned blending and kneading can be conducted by the usual means such as ribbon blender, Henschel mixer, Banbury mixer, drum tumbler, single-screw extruder, twin-screw extruder, cokneader, and mutli-screw extruder. The heating temperature at kneading is usually selected in the range of 250° to 300° C.

Polycarbonate resin composition thus obtained can be formed into moldings for cars such as glass and sunroofs and moldings for home electric appliances through conventional various methods of molding, such as injection molding, blow molding, extrusion molding, compression molding, calender molding, and rotation molding.

The resin composition of the present invention can comprise various additives, other synthetic resins, and elastomers, if necessary, so far as the object of the present invention is not impaired. For example, various additives include hindered phenol-based antioxidants, phosphite-based antioxidants, phosphate-based antioxidants, and amine-based antioxidants; ultraviolet absorbents such as benzotriazol-based and benzophenone-based ones; optical stabilizers such as hindered amine-based ones; external lubricants such as aliphatic carboxylate-based and paraffin-based ones; flame retarders of common use; mold-releasing agents, antistatic agents, and coloring agents.

The present invention will be described in greater detail with reference to Preparation Examples, Examples and Comparative Examples.

I. PC-PDMS Copolymer-based Resin Composition

PREPARATION EXAMPLE 1A (Preparation of Polycarbonate (PC) Oligomer)

Into 400 L (=liter) of 5% aqueous solution of sodium hydroxide, 60 kg of bisphenol A was dissolved to prepare a sodium hydroxide aqueous solution of bisphenol A. Subsequently, the sodium hydroxide aqueous solution of bisphenol A kept at room temperature and methylene chloride were introduced, at a flow rate of 138 L/hr and 69 L/hr, respectively, through an orifice plate into a tubular reactor with an inner diameter of 10 mm, and a tube length of 10 m. In cocurrent therewith, phosgene was blown in at a flow rate of 10.7 kg/hr, and reacted continuously for 3 hours. The tubular ractor used therein consists of double tube, and cooling water was passed through the jacket to keep the temperature of the reaction solution at 25° C. at exhaustion. The pH of the exhaust solution was adjusted to 10 to 11. The reaction solution thus obtained was allowed to stand still, and the aqueous phase was separated and removed. Then, methylene chloride phase (220 L) was taken out, 170 L of methylene chloride was further added thereto, and the mixture was fully stirred to obtain PC oligomer (concentration: 317 g/L).

The degree of polymerization of PC oligomer obtained therein was 3 to 4.

PREPARATION EXAMPLE 2-1A (Preparation of Reactive Polydimethylsiloxane A (PDMS-A))

1483 g of octamethylcyclotetrasiloxane, 336 g of 1,1,3,3-tetramethyldisiloxane and 35 g of 86% sulfuric acid were mixed, and stirred for 17 hours at room temperature. Then, the oil phase was separated, 25 g of sodium hydrogencarbonate was added, and stirred for 1 hour. The mixture was filtered, vacuum-distilled at 150° C. at 3 torr, and thus low-boiling point matter was removed.

To the mixture of 60 g of 2-allylphenol and 0.0014 g of platinum as a platinum chloride-alcoholate complex, 294 g of the oil as obtained above was added at a temperature of 90° C.. Said mixture was stirred for 3 hours, being kept at 90° to 115° C., and then washed three times with 80% aqueous methanol to remove excessive 2-allylphenol. The resulting product was dried with anhydrous sodium sulfate, and the solvent was vacuum-distilled away till the temperature reaches 115° C.

In the resulting PDMS-A having phenol at the terminal, according to NMR analysis, the repeating number of dimethylsilanoxy unit was 10.

PREPARATION EXAMPLE 2-2A (Preparation of Reactive PDMS-B)

The procedure of Preparation Example 2-1A was repeated except that the amount of 1,1,3,3-tetramethyldisiloxane was 96 g.

In the resulting PDMS-B having phenol at the terminal, according to NM R analysis, the repeating number of dimethylsilanoxy unit was 30.

PREPARATION EXAMPLE 2-3A (Preparation of Reactive PDMS-C)

The Procedure of Preparation Example 2-1A was repeated except that the amount of 1,1,3,3-tetramethyldisiloxne was 56 g.

In the resulting PDMS-C having phenol at the terminal, the repeating number of dimethylsilanoxy unit was 50 according to NMR analysis.

PREPARATION EXAMPLE 2-4A (Preparation of Reactive PDMS-D)

The procedure of Preparation Example 2-1A was repeated except that the amount of 1,1,3,3-tetramethyldisiloxane was 18.1 g. In the resulting PDMS-D having phenol group at the terminal, according to NMR analysis, the repeating number of dimethylsilanoxy unit was 150.

PREPARATION EXAMPLE 3-1A to 8A

Into 2 L of methylene chloride, a g of reactive PDMS-X was dissolved, and mixed with 10 L of PC oligomer as obtained in Preparation Example 1A. To the resulting mixture, a solution obtained by dissolving b g of sodium hydroxide in 1 L of water and 5.7 cc of triethylamine were added, and stirred for 1 hour at 500 rpm at room temperature. After that, a solution obtained by dissolving 600 g of hisphenol A in 5 L of 5.2% by weight aqueous solution of sodium hydroxide, 8 L of methylene chloride and 60 g of p-tert-butylphenol were added, and the resulting mixture was stirred for 2 hours at 500 rpm at room temperature. Then, 5 L of methylene chloride was added thereto, and the mixture was washed with 5 L of water, alkali washed with 5 L of 0.01N aqueous solution of sodium hydroxide, acid washed with 5 L of 0.1N hydrochloric acid, and washed with 5 L of water, in this order, and lastly methylene chloride was removed to obtain chipped PC-PDMS copolymer.

The copolymer obtained was dried at 100° C. for 6 hours, press-molded at 290 ° C. and refractive index ($n_D$) of the molding was determined.

Values of X, a, and b of Preparation Examples 3-1A to 8A, PDMS content and ($n_D$) of the resulting PC-PDMS copolymer are shown in Table 1A.

TABLE 1-A

| | X | a | b | PDMS Content (Wt %) | $n_D$ |
|---|---|---|---|---|---|
| Preparation Example 3-1A | A | 858 | 70 | 19.3 | 1.544 |
| Preparation Example 3-2A | B | 858 | 46 | 19.6 | 1.545 |
| Preparation Example 3-3A | C | 858 | 28 | 19.5 | 1.545 |
| Preparation Example 3-4A | D | 858 | 26 | 19.4 | opaque |
| Preparation Example 3-5A | B | 752 | 41 | 17.5 | 1.549 |
| Preparation Example 3-6A | B | 975 | 53 | 21.4 | 1.541 |
| Preparation Example 3-7A | B | 1653 | 90 | 30.3 | 1.533 |
| Preparation Example 3-8A | B | 100 | 6 | 2.2 | 1.579 |

Determination of PDMS content, chain length of PDMS (dimethylsilanoxy unit) and $n_D$ were conducted in the following manner.

1) Determination of PDMS content and chain length of PDMS

PDMS content was found from the intensity ratio of the peak attributed to methyl group of isopropyl of bisphenol A at 1.7 ppm, and the peak attributed to the methyl group of dimethylsiloxane at 0.2 ppm by $^1$H-NMR.

Chain length of PDMS was found by the intensity ratio of the peak attributed to the methyl group of dimethylsiloxane at 0.2 ppm and the peak of methylene group of PC-PDMS bond at 2.6 ppm by 1H-NM R.

2) Determination of $n_D$
Performed by Abbe refractometer.

Examples 1A to 7A and Comparative Examples 1A to 5A

Copolymers obtained in Preparation Examples 3-1A to 8A as PC-PDMS copolymers, Toughlon FN 2200 (manufactured by Idemitsu Petrochemical Co., Ltd.) as polycarbonate resin, and MA-409C (manufactured by Asahi Fiber Glass Co., Ltd., $n_D$=1.545) as glass fiber were used in the proportions as shown in Table 2A to be pelletized at 300 ° C. in a 30 mm vented extruder. The glass fiber was fed from a lower position in the flow than that of hopper feeding of the extruder.

The resulting pellets were press-molded at 300° C..

EXAMPLE 8A

The copolymer obtained in Preparation Example 3-7A and Toughlon FN 2200 (manufactured by Idemitsu Petrochemical Co., Ltd.) as polycarbonate resin were mixed at 300° C. in a ratio (by weight) of 61.4: 38.6 using an extruder. The same reaction as in Example 1A was conducted except that the resulting mixed resin was used. $n_D$ of said mixed resin was 1.547. Example 9A and Comparative Example 6A The same procedure as in Example 1A was conducted except that glass beads (EGB-731A, manufactured by Toshiba-Ballotini Co., Ltd., $n_D$=1.545) was used as glass.

EXAMPLE 10A

The same procedure as in Example 9A was conducted except that the copolymer obtained in Preparation Example 3-8A and a glass fiber (ECR(electric corrosion resistant) glass, manufactured by Asahi Fiber Glass Co., Ltd., $n_D$=1.579) was used as glass.

EXAMPLE 11A

The copolymer obtained in Preparation Example 3-2A and Toughlon FN 2200 (manufactured by Idemitsu Petrochemical Co., Ltd.) as the polycarbonate resin were mixed in an extruder at 300° C. in a ratio (by weight) of 11.2: 88.8, respectively. The same reaction was conducted as in Example 1A except that the resulting mixed resin was used. The $n_D$ of the mixed resin was 1.579.

The reaction of Example 9A was repeated except that the resulting mixed resin and glass fiber (ECR glass) as glass were used.

The moldings obtained in Examples and Comparative Examples were subjected to determination of haze and flame retardance test. The results of determination are shown in Table 3-A.

The properties were evaluated according to the test methods as follows.

1) Determination of Haze

Test samples with a thickness of 3 mm was determined in accordance with JIS K-7105.

2) Flame Retardance Test

Flame Retardance Test UL-94, 1/16 inch (in thickness)

Vertical Flaming Test was conducted in accordance with Underwriters Laboratory Subject 94.

TABLE 2-A

| | PC—PDMS Copolymer | | PC | Glass | |
| --- | --- | --- | --- | --- | --- |
| | Kind | Amount (wt %) | Amount (wt %) | Amount (wt %) | $\Delta n_D$* |
| Example 1A | 3-1A | 70 | 0 | 30 | 0.001 |
| Example 2A | 3-2A | 70 | 0 | 30 | 0 |
| Example 3A | 3-3A | 70 | 0 | 30 | 0 |
| Example 4A | 3-5A | 70 | 0 | 30 | 0.004 |
| Example 5A | 3-6A | 70 | 0 | 30 | 0.004 |
| Example 6A | 3-2A | 90 | 0 | 10 | 0 |
| Example 7A | 3-2A | 50 | 0 | 50 | 0 |
| Example 8A | 3-7A | 43 | 27 | 30 | 0.002 |
| Example 9A | 3-2A | 70 | 0 | 30 | 0 |
| Example 10A | 3-8A | 70 | 0 | 30 | 0 |
| Example 11A | 3-2A | 7.8 | 62.2 | 30 | 0 |
| Comparative Example 1A | — | 0 | 70 | 30 | 0.04 |
| Comparative Example 2A | — | 0 | 90 | 10 | 0.04 |
| Comparative Example 3A | — | 0 | 50 | 50 | 0.04 |
| Comparative Example 4A | 3-7A | 90 | 0 | 10 | 0.011 |
| Comparative Example 5A | 3-7A | 70 | 0 | 30 | 0.011 |
| Comparative Example 6A | — | 0 | 70 | 30 | 0.04 |

Kind of PC—PDMS Copolymer: Number of Preparation Example
*Difference between $n_D$ of mixed resin and that of glass (absolute value)

TABLE 3-A

| | Haze (%) | Flaming Test |
| --- | --- | --- |
| Example 1A | 14 | V-0 |
| Example 2A | 11 | V-0 |
| Example 3A | 12 | V-0 |
| Example 4A | 20 | V-0 |
| Example 5A | 22 | V-0 |
| Example 6A | 9 | V-0 |
| Example 7A | 13 | V-0 |
| Example 8A | 17 | V-0 |
| Example 9A | 12 | V-0 |
| Example 10A | 11 | V-2 |
| Example 11A | 11 | V-2 |
| Comparative Example 1A | 91 | V-0 |
| Comparative Example 2A | 90 | V-2 |
| Comparative Example 3A | 91 | V-2 |
| Comparative Example 4A | 85 | V-0 |
| Comparative Example 5A | 89 | V-0 |
| Comparative Example 6A | 90 | V-2 |

II. PC-PMMA Copolymer-Based Resin Composition

PREPARATION EXAMPLE 1B (Preparation of Polycarbonate (PC) Oligomer)

Into 400 L of 5% aqueous solution of sodium hydroxide, 60 kg of bisphenol A was dissolved to prepare a sodium hydroxide aqueous solution of bisphenol A. Subsequently, the sodium hydroxide aqueous solution of bisphenol A kept at room temperature and methylene chloride were introduced, at a flow rate of 138 L/hr and 69 L/hr, respectively, through an orifice plate into a tubular reactor having an inner diameter of 10 mm and a tube length of 10 m. In cocurrent therewith, phosgene was blown in at a flow rate of 10.7 kg/hr, and reacted continuously for 3 hours. The tubular reactor used therein consists of double tube, and cooling water was passed through the jacket to keep the temperature of the reaction solution 25° C. at exhaustion. The pH of the exhaust solution was adjusted to 10 to 11. The reaction solution thus obtained was allowed to stand still, and the aqueous phase was separated and removed. Then, methylene chloride phase (220 L) was taken out, and further 170 L of methylene chloride was added thereto, and the mixture was sufficiently stirred to obtain PC oligomer (concentration: 317 g/L).

The degree of polymerization of PC oligomer obtained therein was 3 to 4.

PREPARATION EXAMPLE 2-1B (Preparation of Reactive PMMA-A)

Into 2 L of tetrahydrofuran, 1 kg of methyl methacrylate, 11.5 g of azobisisobutyronitrile (polymerization initiator), and 31.7 g of thiomaleic acid (chain-transfer agent) were dissolved, heated to 60° C., and reacted for 3 hours. The reaction product was poured into 20 L of petroleum ether while stirring, and polymer was precipitated out, filtered and dried.

Subsequently, the resulting polymer was dissolved into methylene chloride and washed with water. Thereafter, methylene chloride was evaporated to dryness to obtain reactive PMMA-A in flake form. Titration of carboxylic acid with KOH showed that the number average molecular weight of the product was 10,000.

PREPARATION EXAMPLE 2-2B (Preparation of Reactive PMMA-B)

The procedure of Preparation Example 2-1B was repeated except that 19.5 g of thioglycolic acid was used in place of thiomaleic acid. Titration of carboxylic group with KOH showed that the number average molecular weight of the product was 9,000.

PREPARATION EXAMPLE 3-1B (Preparation of PC-PMMA Copolymer A: Graft Copolymer)

Into 2 L of methylene chloride, 450 g of PC oligomer as obtained in Preparation Example 1 and 410 g of reactive PMMA-A as obtained in Preparation Example 2-1 were dissolved, 11.4 cc of triethylamine was added thereto, and the resulting mixture was reacted for 1 hour while stirring. Thereafter, the reaction product was washed with 0.1N hydrochloric acid, thus the organic phase was separated to obtain a prepolymer solution.

To the resulting prepolymer solution, methylene chloride was added to make 4 L of solution, and 4 g p-tert-butylphenol was added thereto to obtain an organic solvent.

On the other hand, 81 g of hisphenol A, 50 g of sodium hydroxide and 0.54 cc of triethylamine were dissolved into water to obtain 1.1 L of solution, which was subjected to interfacial polycondensation for 1 hour with the solution of the organic solvent solution at 500 rpm at room temperature. Thereafter, 4 L of methylene chloride was added, and further the mixture was washed with 4 L of water, alkali washed with 5 L of aqueous solution of 0.01N sodium hydroxide, acid washed with 5 L of 0.1N chloric acid, and washed 5 L of water in this order. Lastly methylene chloride was removed away to obtain chipped PC-PMMA copolymer.

The resulting copolymer was dried for 6 hours at 100° C., press-molded at 290° C., and the resulting molding was determined for refractive index.

PREPARATION EXAMPLE 3-2B (Preparation of PC-PMMA Copolymer B: Graft Copolymer)

The procedure of Preparation Example 3-1B was repeated except that 660 g of reactive PMMA-A, 18.4 cc of triethylamine, and 78 g of hisphenol A and 47 g of sodium hydroxide were used.

PREPARATION EXAMPLE 3-3B (Preparation of PC-PMMA Copolymer C: Block Copolymer)

The procedure of Preparation Example 3-1B was repeated except that 410 g of reactive PMMA-B was used in place of reactive PMMA-A, 5.7 cc of triethylamine, and 85 g of bisphenol A and 52 g of sodium hydroxide were used, and that p-tert-butylphenol was not added.

PREPARATION EXAMPLE 3-4B (Preparation of PC-PMMA Copolymer D: Block Copolymer)

The procedure of Preparation Example 3-3B was repeated except hat 660 g of reactive PMMA-B, 9.2 cc of triethylamine, 83 g of bisphenol h and 51 g of sodium hydroxide were used.

PREPARATION EXAMPLE 3-5B (Preparation of PC-PMMA Copolymer E: Graft Copolymer)

The procedure of Preparation Example 3-1B was repeated except that 60 g of reactive PMMA-A was used, and that 1.7 cc of triethylamine, 87 g of bisphenol A and 43 g of sodium hydroxide were used.

PMMA contents and refractive indexes ($n_D$) of PC-PMMA copolymers obtained in Preparation Examples 3-1B to 5B are shown in Table 1-B.

TABLE 1-B

| Kind | Preparation Example | PMMA Content in PC—PMMA Copolymer (wt %) | $n_D$ |
|---|---|---|---|
| A | Preparation Example 3-1B | 42.5 | 1.544 |
| B | Preparation Example 3-2B | 55.2 | 1.531 |
| C | Preparation Example 3-3B | 43.3 | 1.543 |
| D | Preparation Example 3-4B | 55.8 | 1.530 |
| E | Preparation Example 3-5B | 6.2 | 1.579 |

PC-PMMA copolymer B obtained in Preparation Example 3-2B and Toughlon FN 2200 (manufactured by Idemitsu Petrochemical Co., Ltd.) as polycarbonate resin were mixed by an extruder at 300° C. in a ratio (by weight) of 76: 24, respectively. This mixed resin was used in Examples 5B, 7B, 8B and 9B.

Further, PC-PMMA copolymer D obtained in Preparation Example 3-4B and Toughlon FN 2200 as polycarbonate resin were mixed by an extruder at 300° C. in a ratio (by weight) of 76: 24. The $n_D$ of the resulting mixed resin was 1.545. Said mixed resin was used in Example 6B.

PMMA content in PC-PMMA copolymer was determined by nuclear magnetic resonance (NMR) spectrum, and the refractive index was determined by Abbe refractometer.

Examples 1B to 8B and Comparative Examples 1B to 5B

As PC-PMMA copolymers, PC-PMMA copolymers A, B, C, and D obtained in Preparation Examples 3-1B to 4B were used.

As polycarbonate resin (PC), Toughlon FN 2200 (manufactured by Idemitsu Petrochemical Co., Ltd.) was used.

As glass fiber, MA-409C (manufactured by Asahi Fiber Glass Co., Ltd., $n_D$=1.545) was used, and these, in the proportions as shown in Table 2, were pelletized at 300° C. by a 30 mm-vented extruder. Glass fiber was fed from a position lower in flow course than the position at which the material resin was fed by a hopper of the extruder.

The resulting pellet was press-molded at 300° C.

Example 9B and Comparative Example 6B

The procedure of Example 1B was repeated except that the proportions of materials were as shown in Table 2, and that glass beads (EGB0731A: manufactured by Toshiba Ballotini Co., Ltd., $n_D$=1.545) was used as glass.

EXAMPLE 10B

The procedure of Example 1B was repeated except that glass fiber (ECR(electric corrosion resistant) glass, manufactured by Asahi Fiber Glass Co., Ltd., $n_D$=1.579) was used as glass.

EXAMPLE 11B

PC-PMMA copolymer obtained in Preparation Example 3-1B and Toughlon FN 2200 as polycarbonate resin were mixed at 300° C. by an extruder in a proportion (by weight) of 15: 85. The $n_D$ of said mixed resin was 1.578. The procedure of Example 1B was repeated except that the resulting mixed resin and ECR glass as glass fiber were used.

The moldings obtained in Examples and Comparative Examples were determined for haze and refractive index. The results of determination are shown in Table 2-B. Determination of haze and refractive index were conducted in accordance with the above-mentioned test methods.

TABLE 2-B

| | PC—PMMA Copolymer | | PC | Glass | | |
|---|---|---|---|---|---|---|
| | Kind | Amount (wt %) | Amount (wt %) | Amount (wt %) | $\Delta n_D$* | Haze (%) |
| Example 1B | A | 70 | 0 | 30 | 0.001 | 15 |
| Example 2B | C | 70 | 0 | 30 | 0.002 | 18 |
| Example 3B | A | 90 | 0 | 10 | 0.001 | 14 |
| Example 4B | A | 50 | 0 | 50 | 0.001 | 19 |
| Example 5B | B | 53 | 17 | 30 | 0 | 12 |
| Example 6B | D | 53 | 17 | 30 | 0 | 12 |
| Example 7B | B | 68 | 22 | 10 | 0 | 10 |
| Example 8B | B | 38 | 12 | 50 | 0 | 17 |
| Example 9B | B | 53 | 17 | 30 | 0 | 17 |
| Example 10B | E | 70 | 0 | 30 | 0 | 12 |
| Example 11B | A | 10.5 | 59.5 | 30 | 0.001 | 13 |
| Comparative Example 1B | — | 0 | 70 | 30 | 0.04 | 91 |
| Comparative Example 2B | — | 0 | 90 | 10 | 0.04 | 90 |
| Comparative Example 3B | — | 0 | 50 | 50 | 0.04 | 91 |
| Comparative Example 4B | B | 70 | 0 | 30 | 0.014 | 89 |
| Comparative Example 5B | D | 70 | 0 | 30 | 0.015 | 89 |
| Comparative Example 6B | — | 0 | 70 | 30 | 0.04 | 90 |

*Difference between the refractive index of mixed resin and that of glass (absolute value)

III. PC-FPC Copolymer-Based Resin Composition

PREPARATION EXAMPLE 1-1C (Preparation of PC Oligomer A)

Into 400 L of 5% aqueous solution of sodium hydroxide, 34.8 kg of BPA and 25.2 kg of BPAF were dissolved. Subsequently, said aqueous solution of sodium hydroxide of BPA-BPAF kept at room temperature and methylene chloride were introduced, at a flow rate of 138 L/hr and 69 L/hr, through an orifice plate, into a tubular reactor having an inner diameter of 10 mm and a tube length of 10 m. In cocurrent therewith, phosgene was blown in at a flow rate of 10.7 kg/hr, and reacted continuously for 8 hours. The tubular reactor used therein consisted of double tube, and cooling water was passed through the jacket to keep the reaction solution to be 25° C. at exhaution. The pH of the exhaust solution was adjusted to 10 to 11. The reaction solution thus obtained was allowed to stand still, and the aqueous phase was separated and removed. Then, methylene chloride phase (220 L) was taken out, further 170 L of methylene chloride was added thereto, and sufficiently stirred to obtain PC oligomer A (concentration: 317 g/L).

PREPARATION EXAMPLE 1-2C (Preparation of PC Oligomer B)

The procedure of Preparation Example 1-1C was repeated except that 14.4 kg of BPA and 45.6 kg of BPAF were used.

PREPARATION EXAMPLE 1-3C (Preparation of PC Oligomer C)

The procedure of Preparation Example 1-1C was repeated except that 60 kg of BPAF was used.

PREPARATION EXAMPLE 2-1C (Preparation of PC-FPC Copolymer A)

1.26 L of PC oligomer A was diluted with 2 L of methylene chloride to make Solution I. 76.4 g of sodium hydroxide and 193 g of BPAF were dissolved in 0.9 L of water to make Solution II.

Solution I and Solution II were mixed, and 0.34 ml of triethylamine and 8 g of p-tert-butylphenol were added as the catalyst, and then, the mixture was reacted while stirring for 2 hours.

After the reaction, 5 L of water and 5 L of methylene chloride were added to separate an organic phase and an aqueous phase.

Subsequently, the organic phase was alkali-washed with 0.01N aqueous solution of sodium hydroxide, and further washed with 0.1N hydrochloric acid. Thereafter, methylene chloride was removed by washing with water to obtain BPA-BPAF copolymer A in flake form. The mol% of BPAF was found by NMR analysis.

The flake obtained was dried at 100° C. for 6 hours, press-molded at 290° C., and the refractive index of the molding was found.

PREPARATION EXAMPLE 2-2C (Preparation of PC-FPC Copolymer B)

The procedure of Preparation Example 2-1C was repeated except that PC oligomer B was used.

PREPARATION EXAMPLE 2-3C (Preparation of PC-FPC Copolymer C)

The procedure of Preparation Example 2-1C was repeated except that PC oligomer C was used.

The mol% and refractive indexes ($n_D$) of BPAF in PC-FPC copolymers A, B, and C obtained in Preparation Examples 2-1C to 3C are shown in Table 1-C.

TABLE 1-C

| | PC—FPC Copolymer | | |
|---|---|---|---|
| Kind | BPA (mol %) | BPAF (mol %) | $n_D$ |
| A | 50 | 50 | 1.542 |
| B | 25 | 75 | 1.521 |
| C | 0 | 100 | 1.502 |

PC-FPC copolymer B obtained in Preparation Example 2-2C and Toughlon FN 2200 (manufactured by Idemitsu Petrochemical Co., Ltd.) as polycarbonate resin were mixed at 300° C. in a proportion (by weight) of 6: 4, by an extruder. The $n_D$ of the resulting mixed resin was 1.545. Said mixed resin was used in Examples 4C, 5C, 6C and 8C.

PC-FPC copolymer C obtained in Preparation Example 2-3C and Toughlon FN 2200 as polycarbonate resin were mixed at 300° C. in a proportion (by weight) of 44.3: 55.7, by an extruder. The $n_D$ of the resulting mixed resin was 1.544. This mixed resin was used in Example 7C.

The refractive index was determined by Abbe refractometer.

Examples 1C to 7C and Comparative Examples 1C to 5C

As PC-FPC copolymers, PC-FPC copolymers A, B, and C obtained in Preparation Examples 2-1C to 3C.

As polycarbonate resin, Toughlon FN 2200 (manufactured by Idemitsu Petrochemical Co., Ltd.) was used.

As glass fiber, MA-409C (manufactured by Asahi Fiber Glass Co., Ltd., $n_D$=1.545) was used, and these materials, in the proportions as shown in Table 2, were pelletized at 300° C. by a 30 mm-vented extruder.

The glass fiber was fed from a position lower in flow course than the position at which the material resins were fed by hopper, in the extruder. The resulting pellets were press-molded at 300° C.

Example 8C and Comparative Example 6C

The procedure of Example 1C was repeated using the materials in the proportions as shown in Table 2-C, except that glass beads (EGB-731A: manufactured by Toshiba Ballotini Co., Ltd., $n_D$=1.545) was used as glass.

EXAMPLE 9C

PC-FPC copolymer A obtained in Preparation Example 2-1C and Toughlon FN 2200 as polycarbonate resin were mixed at 300° C. in a proportion (by weight) of 14: 86 by an extruder. The $n_D$ of the resulting mixed resin was 1.579. Glass fiber (ECR (electric corrosion resistant) glass, manufactured by Asahi Fiber Glass Co., Ltd., $n_D$1.579) was used as glass, and the materials in the proportions as shown in Table 2-C were pelletized at 300° C. by a 30 mm-vented extruder. The resulting pellets were press-molded at 300° C..

EXAMPLE 10C

PC-FPC copolymer B obtained in Preparation Example 2-2C and Toughlon FN 2200 as polycarbonate resin were mixed at 300° C. in a proportion (by weight) of 9.4: 90.6 by an extruder. The $n_D$ of the resulting mixed resin was 1.578. As glass, glass fiber (ECR glass) was used, and the materials in the proportion as shown in Table 2-C were pelletized at 300° C. by a 30 mm-vented extruder. The resulting pellets were press-molded at 300° C..

The moldings obtained in Examples and Comparative Examples were determined for haze and refractive index. The results of determination are shown in Table 2-C. Determinations of haze and refractive index were conducted in accordance with the abovementioned test methods.

TABLE 2-C

| | PC—FPC Copolymer | | PC | Glass | | |
|---|---|---|---|---|---|---|
| | Kind | Amount (wt %) | Amount (wt %) | Amount (wt %) | $\Delta n_D$* | Haze (%) |
| Example 1C | A | 90 | 0 | 10 | 0.003 | 21 |
| Example 2C | A | 70 | 0 | 30 | 0.003 | 20 |
| Example 3C | A | 50 | 0 | 50 | 0.003 | 28 |
| Example 4C | B | 54 | 36 | 10 | 0 | 9 |
| Example 5C | B | 42 | 28 | 30 | 0 | 12 |
| Example 6C | B | 30 | 20 | 50 | 0 | 14 |

TABLE 2-C-continued

| | PC—FPC Copolymer | | PC | Glass | | |
|---|---|---|---|---|---|---|
| | Kind | Amount (wt %) | Amount (wt %) | Amount (wt %) | $\Delta n_D$* | Haze (%) |
| Example 7C | C | 31 | 39 | 30 | 0.001 | 16 |
| Example 8C | B | 42 | 28 | 30 | 0 | 13 |
| Example 9C | A | 9.8 | 60.2 | 30 | 0 | 11 |
| Example 10C | B | 6.6 | 63.4 | 30 | 0.001 | 13 |
| Comparative Example 1C | — | 0 | 90 | 10 | 0.04 | 90 |
| Comparative Example 2C | — | 0 | 70 | 30 | 0.04 | 91 |
| Comparative Example 3C | — | 0 | 50 | 50 | 0.04 | 91 |
| Comparative Example 4C | B | 70 | 0 | 30 | 0.024 | 87 |
| Comparative Example 5C | C | 70 | 0 | 30 | 0.043 | 90 |
| Comparative Example 6C | — | 0 | 70 | 30 | 0.04 | 90 |

*Difference between the refractive index of mixed resin and that of glass (absolute value)

IV. PC-BPC Copolymer-Based Resin Composition

Glass A: MA-409C, manufactured by Asahi Fiber Glass Co., Ltd.(glass fiber, $n_D$=1.545)

Glass B: EGB-731A, manufactured by Toshiba Ballotini Co., Ltd.(glass beads, $n_D$=1.545)

Glass C: ECR glass, manufactured by Asahi Fiber Glass Co., Ltd. (glass fiber, $n_D$=1.579)

PREPARATION EXAMPLE 1-1D (Preparation of BPA-BPC Oligomer A)

Into 400 L of 5% aqueous solution of sodium hydroxide, 46.9 kg of bisphenol A (BPA) and 13.1 kg of BPC (bisphenol C) were dissolved. Subsequently, said sodium hydroxide aqueous solution of BPA-BPC kept at room temperature and methylene chloride were introduced, at a flow rate of 138 L/hr and 69 L/hr, respectively, through an orifice plate, into a tubular reactor having an inner diameter of 10 mm and a tube length of 10 m. In cocurrent therewith, phosgene was blown in at a flow rate of 10.7 kg/hr, and the mixture was reacted continuously for 3 hours.

The reactor used therein consisted of double tube, and cooling water was passed through the jacket to keep the exhaution temperature of the reaction solution to 25° C. The pH of the exhaust solution was adjusted to 10 to 11. The reaction solution thus obtained was allowed to stand still, thereby the aqueous phase was separated to remove, and methylene chloride phase (220 L) was taken out. Further 170 L of methylene chloride was added thereto, and the resulting mixture was sufficiently stirred to obtain PBA-BPC oligomer A (concentration: 317 g/L).

PREPARATION EXAMPLE 1-2D (Preparation of BPA-BPC Oligomer B)

The procedure of Preparation Example 1-1D was repeated except that 60 kg of BPC was used in place of 46.9 kg of BPA and 13.1 kg of BPC.

PREPARATION EXAMPLE 2-1D (Preparation of BPA-BPC Copolymer A)

1.26 L of BPA-BPC oligomer A was diluted with 2 L of methylene chloride to make Solution I. 76.4 g of sodium hydroxide and 147 g of BPC were dissolved into 0.9 L of water to make Solution II.

Solution I and Solution II were mixed, and 0.34 ml of triethylamine and 8 g of p-tert-butylphenol as the catalyst were added. Then the mixture was reacted for 2 hours while stirring.

After the reaction was completed, 5 L of water and 5 L of methylene chloride were added to separate organic phase and aqueous please.

Subsequently, the organic phase was alkali washed with 0.01N sodium hydroxide solution, and further washed with 0.1N hydrochloric acid. Thereafter, methylene chloride was removed by washing with water, and PBA-BPC copolymer A in flake form was obtained. The mol% of BPC was found by NMR analysis.

The resulting flake was dried at 100° C. for 6 hours, press-molded at 290° C., and the molding was determined for refractive index.

PREPARATION EXAMPLE 2-2D (Preparation of BPA-BPC Copolymer B)

The procedure of Preparation Example 2-1D was repeated except that BPA-BPC oligomer B was used.

The mol% of BPC in BPA-BPC copolymers A and B obtained in PREPARATION EXAMPLES 2-1D and 2D are shown in Table 1-D.

TABLE 1-D

|  | BPC Content (wt %) | $n_D$ |
| --- | --- | --- |
| BPA—BPC Copolymer A | 43 | 1.579 |
| BPA—BPC Copolymer B | 100 | 1.571 |

BPA-BPC copolymer B obtained in Preparation Example 2-2D and Toughlon FN 2200 (manufactured by Idemitsu Petrochemical Co., Ltd.) as polycarbonate resin were mixed at 300° C. in a proportion(by weight) of 35: 65 by an extruder. The $n_D$ of the resulting mixed resin was 1.580. Said mixed resin was used in Example 2D.

Examples 1D to 4D (Mixing of Complexed Material)

As BPA-BPC copolymer, BPA-BPC copolymers A and B obtained in Examples 2-1D and 2D were used. As polycarbonate resin, Toughlon FN 2200 (manufactured by Idemitsu Petrochemical Co., Ltd.) was used. As glass, the aforementioned glass C was used, and the materials in the proportions shown in Table 2-D were pelletized at 300° C. by a 30 mm-vented extruder. Glass fiber was fed from a position lower in flow course than the position at which the material resins were fed by hopper in the extruder. The resulting pellets were press-molded at 300 ° C.

The moldings obtained in the Examples were determined for haze and refractive index. The results of determination are shown in Table 2-D. Determinations of haze and refractive index were conducted in accordance with the above-mentioned test methods.

TABLE 2-D

| | BPA—BPC Copolymer | | PC | Glass | | | |
| --- | --- | --- | --- | --- | --- | --- | --- |
| | Kind | A-mount (wt %) | A-mount (wt %) | Kind | A-mount (wt %) | $\Delta n_D$* | Haze (%) |
| Example 1D | A | 70 | 0 | C | 30 | 0 | 11 |

TABLE 2-D-continued

| | BPA—BPC Copolymer | | PC | Glass | | | |
| --- | --- | --- | --- | --- | --- | --- | --- |
| | Kind | A-mount (wt %) | A-mount (wt %) | Kind | A-mount (wt %) | $\Delta n_D$* | Haze (%) |
| Example 2D | A | 90 | 0 | C | 10 | 0 | 9 |
| Example 3D | A | 50 | 0 | C | 50 | 0 | 13 |
| Example 4D | B | 24.5 | 45.5 | C | 30 | 0.001 | 15 |

*Difference between the refractive index of the mixed resin and that of glass (absolute value)

V. PC-DDCA Copolymer-Based Resin Composition

PREPARATION EXAMPLE 1E (Preparation of Polycarbonate (PC) Oligomer)

Into 400 L of 5% aqueous solution of sodium hydroxide, 60 kg of bisphenol A was dissolved to prepare a sodium hydroxide aqueous solution of bisphenol A. Subsequently, sodium hydroxide aqueous solution of bisphenol A kept at room temperature and methylene chloride were introduced, at a flow rate of 138 L/hr and 69 L/hr, respectively, through an orifice plate, into a tubular reactor having an inner diameter of 10 mm and a tube length of 10 m. In cocurrent therewith, phosgene was blown in at a flow rate of 10.7 kg/hr, and the mixture was continuously reacted for 3 hours. The tubular reactor used therein consisted of double tube, and cooling water was passed through the jacket thereof to keep the temperature of the reaction solution at exhaution at 25° C.. The pH of the exhaust solution was adjusted to 10 to 11. The reaction solution thus obtained was allowed to stand still, and the aqueous phase was separated to remove, and methylene chloride phase (220 L) was taken out. Further 170 L of methylene chloride was added thereto, and the mixture was sufficiently stirred to obtain PC oligomer (concentration: 317 g/L).

The degree of polymerization of PC oligomer obtained therein was 3 to 4.

PREPARATION EXAMPLE 2-1E (Preparation of PC-DDCA Copolymer A)

700 g of DDCA and 364 g of sodium hydroxide were dissolved in 2.5 L of water, the resulting solution was mixed with 10 L of PC oligomer obtained in Example 1E, 5.7 cc of triethylamine was added thereto and the mixture was stirred at 500 rpm at room temperature for 1 hour. Thereafter, a solution obtained by dissolving 600 g of bisphenol A into 5 L of 5.2% by weight of sodium hydroxide aqueous solution, 8 L of methylene chloride and 60 g of p-tert-butylphenol were added, and the mixture was stirred at 500 rpm at room temperature for 2 hours. Then, 5 L of methylene chloride was added, and the mixture was washed with 5 L of water, alkali washed with 5 L of 0.01N sodium hydroxide aqueous solution, acid washed with 5 L of 0.1N hydrochloric acid, and washed with 5 L of water, in this order, and lastly methylene chloride was removed to obtain chipped PC-DDCA copolymer A. The resulting copolymer has a DDCA content of 8.8% by weight according to NMR analysis.

The resulting copolymer was dried at 100 ° C. for 6 hours, press-molded at 290° C., and determined for refractive index. As the result, $n_D$=1.579.

PREPARATION EXAMPLE 2-2E (Preparation of PC-DDCA Copolymer B)

The procedure of Preparation Example 2-1E was repeated except that 1,000 g of DDCA and 520 g of sodium hydroxide were used.

The resulting copolymer has a DDCA content of 12.6% by weight according to NMR analysis, and $n_D$=1.576.

The mol% and refractive index ($n_D$) of DDCA in PC-DDCA copolymers A and B obtained in Preparation Examples 2-1E and 2E are shown in Table 1-E.

TABLE 1-E

|  | DDCA Content (wt %) | $n_D$ |
|---|---|---|
| PC—DDCA Copolymer A | 8.8 | 1.579 |
| PC—DDCA Copolymer B | 12.6 | 1.576 |
| PC—DDCA Copolymer C | 7.2 | 1.581 |

PC-DDCA copolymer B obtained in Preparation Example 2-2E and Toughlon FN 2200 (manufactured by Idemitsu Petrochemical Co., Ltd.) as polycarbonate resin were mixed at 300° C. in the proportion (by weight) of 69.8: 30.2 by an extruder. The nD of said mixed resin was 1.579. Said mixed resin was used in Example 6E.

EXAMPLES 1E to 6E (Preparation of Complexed Resin)

As PC-DDCA copolymer, the polymers obtained in Preparation Examples 2-1E and 2E, and Lexane SP-1110 (manufactured by GE Plastics Co., Ltd., DDCA content: 7.2% by weight, $n_D$=1.581) as a commercially available product, and Toughlon FN 2200 (manufactured by Idemitsu Petrochemical Co., Ltd.) as polycarbonate resin were pelletized at 300° C. in the proportions (by weight) as shown in Table 2 by a 30 mm-vented extruder. Glass was fed from a position lower in flow course than the position of hopper feeding of the material resin in the extruder (in Table 1-E, commercially available Lexane SP-1110 was used as Copolymer C). The resulting pellets were press-molded at 300° C..

The moldings obtained in the Examples were determined for haze and refractive index. The results of determination are shown in Table 2-E. Determinations of haze and refractive index were conducted in accordance with the above-mentioned test methods.

TABLE 2-E

| | PC—DDCA Copolymer | | PC | Glass | | | |
|---|---|---|---|---|---|---|---|
| | Kind | Amount (wt %) | Amount (wt %) | Kind | Amount (wt %) | $\Delta n_D$* | Haze (%) |
| Example 1E | A | 70 | 0 | C | 30 | 0 | 11 |
| Example 2E | A | 90 | 0 | C | 10 | 0 | 9 |
| Example 3E | A | 50 | 0 | C | 50 | 0 | 14 |
| Example 4E | B | 70 | 0 | C | 30 | 0.003 | 19 |
| Example 5E | C | 70 | 0 | C | 30 | 0.002 | 16 |
| Example 6E | B | 48.9 | 21.1 | C | 30 | 0 | 12 |

TABLE 2-E-continued

| | PC—DDCA Copolymer | | PC | Glass | | | |
|---|---|---|---|---|---|---|---|
| | Kind | Amount (wt %) | Amount (wt %) | Kind | Amount (wt %) | $\Delta n_D$* | Haze (%) |

*Difference between the refractive index of the mixed resin and that of glass (absolute value)

INDUSTRIAL AVAILABILITY

As described above, according to the present invention, a polycarbonate resin composition excellent in transparency and flame retardance while possessing mechanical properties inherent in polycarbonate can be obtained.

Therefore, the polycarbonate resin composition of the present invention is effectively used as the material for various molding products which are extensively used in the fields of electric and electronic appliances, and automobiles.

What is claimed is:

1. A polycarbonate resin composition having a haze of not more than 22% which comprises
   (A) 10 to 95% by weight of a polycarbonate-based copolymer selected from the group consisting of a polycarbonate-polyorganosiloxane copolymer having a degree of polymerization of not more than 50 and 2.2 to 30.3% by weight of organosiloxane unit in the copolymer, and a polycarbonate-acrylcopolymer having 6.2 to 55.8% by weight of polyacrylate unit in the copolymer,
   (B) 5 to 70% by weight of glass and
   (C) 0 to 85% by weight of polycarbonate resin,
   the difference (absolute value) between the refractive index of the mixed resin of (A) and (C), and that of (B) glass being not more than 0.004.

2. The polycarbonate-based resin composition as defined claim 1 wherein (A) polycarbonate-based copolymer is said polycarbonate-polyorganosiloxane copolymer.

3. The polycarbonate-based resin composition as defined in claim 2 wherein the polyorganosiloxane is polydimethylsiloxane.

4. The polycarbonate-based resin composition as defined in claim 1 wherein (A) polycarbonate-based copolymer is said polycarbonate-acryl copolymer.

5. The polycarbonate resin composition as defined in claim 4 wherein the acryl moiety is polymethyl methacrylate.

6. A process for producing a polycarbonate resin composition having a haze of not more than 22% which comprises kneading
   (A) 10 to 95% by weight of a polycarbonate-based copolymer selected from the group consisting of a polycarbonate-polyorganosiloxane copolymer having a degree of polymerization of not more than 50 and 2.2 to 30.3% by weight of organosiloxane unit in the copolymer, and a polycarbonate-acryl copolymer having 6.2 to 55.8% be weight of polyacrylate unit in the copolymer,
   (B) 5 to 70% by weight of glass and
   (C) 0 to 85% by weight of polycarbonate resin, adjusting the difference (absolute value) between the refractive index of the mixed resin of (A) and (C), and that of (B) glass to be not more than 0.004 by selecting kinds of proportions of the comonomer unit in (A) polycarbonate-based copolymer.

* * * * *